US012457908B2

(12) United States Patent
Parkin et al.

(10) Patent No.: US 12,457,908 B2
(45) Date of Patent: Oct. 28, 2025

(54) MAGNETIC MEMORY DEVICES

(71) Applicant: Samsung Electronics Co., Ltd., Suwon-si (KR)

(72) Inventors: Stuart Papworth Parkin, Halle (DE); See-Hun Yang, Halle (DE); Jiho Yoon, Halle (DE); Ung Hwan Pi, Hwaseong-si (KR)

(73) Assignees: Samsung Electronics Co., Ltd., Suwon-si (KR); Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 379 days.

(21) Appl. No.: 17/983,554

(22) Filed: Nov. 9, 2022

(65) Prior Publication Data

US 2023/0165161 A1   May 25, 2023

(30) Foreign Application Priority Data

Nov. 25, 2021   (KR) .................. 10-2021-0164209

(51) Int. Cl.
*H10N 50/80* (2023.01)
*H10B 61/00* (2023.01)

(52) U.S. Cl.
CPC ............. *H10N 50/80* (2023.02); *H10B 61/00* (2023.02)

(58) Field of Classification Search
CPC ........ H10N 50/80; H10N 50/10; H10B 61/00; G11C 11/161; H01F 10/329; G11B 5/676
See application file for complete search history.

(56) References Cited

U.S. PATENT DOCUMENTS 7,539,051 B2   5/2009   Deligianni et al.
8,194,430 B2   6/2012   Lim
(Continued)

FOREIGN PATENT DOCUMENTS

KR       100937737 B1   1/2010
KR   10-2010-0104413 A   9/2010
(Continued)

OTHER PUBLICATIONS

See-Hun Yang, Kwang-Su Ryu and Stuart Parkin, Domain-wall velocities of up to 750 m s-1 driven by exchange-coupling torque in synthetic antiferromagnets, Nature Nanotech 10, 221-226 (2015) (Year: 2015).*

(Continued)

*Primary Examiner* — Shih Tsun A Chou
(74) *Attorney, Agent, or Firm* — Wolf, Greenfield & Sacks, P.C.

(57) ABSTRACT

A magnetic memory device may include a magnetic track that extends in a first direction. The magnetic track may include a lower magnetic layer that extends in the first direction, an upper magnetic layer that extends in the first direction on the lower magnetic layer, a spacer layer that extends in the first direction between the lower magnetic layer and the upper magnetic layer, and a non-magnetic pattern that penetrates the upper magnetic layer and is on the spacer layer. The non-magnetic pattern has a first junction surface that is in contact with a first portion of the upper magnetic layer, and a second junction surface that is in contact with a second portion of the upper magnetic layer. The lower magnetic layer and the upper magnetic layer are antiferromagnetically coupled to each other by the spacer layer.

20 Claims, 11 Drawing Sheets

(56) References Cited

U.S. PATENT DOCUMENTS

| | | |
|---|---|---|
| 8,313,847 B2 | 11/2012 | Cho et al. |
| 8,514,619 B2 | 8/2013 | Hwang |
| 8,951,811 B2 | 2/2015 | Gaidis et al. |
| 10,062,449 B2 | 8/2018 | Choe |
| 10,090,034 B2 | 10/2018 | Belashchenko et al. |
| 10,141,333 B1 | 11/2018 | Frank |
| 10,885,961 B2 | 1/2021 | Apalkov et al. |
| 2020/0051725 A1* | 2/2020 | Xiao ............ H03K 19/16 |
| 2021/0028228 A1 | 1/2021 | Lee et al. |
| 2021/0050044 A1 | 2/2021 | Lee et al. |

FOREIGN PATENT DOCUMENTS

| | | |
|---|---|---|
| KR | 10-2016-0037447 A | 4/2016 |
| KR | 101698931 B1 | 1/2017 |
| KR | 102043252 B1 | 11/2019 |
| KR | 10-2021-0011535 A | 2/2021 |
| KR | 10-2021-0021228 A | 2/2021 |
| KR | 10-2249874 B1 | 5/2021 |

OTHER PUBLICATIONS

"Dependence of Domain Wall Pinning Potential Landscapes on Domain Wall Chirality and Pinning Site Geometry in Planar Nanowires", L. K. Bogart et al., Physical Review B 79, 054414, 2009.

"Shift Registers Based on Magnetic Domain Wall Ratchets with Perpendicular Anisotropy", J. H. Franken et al., Nature Nanotechnology | vol. 7 | Aug. 2012.

"Voltage-Controlled Domain Wall Traps in Ferromagnetic Nanowires", Uwe Bauer et al., Nature Nanotechnology | Advance Online Publication May 26, 2013.

Yoon et al., Local and global energy barriers for chiral domain walls in synthetic antiferromagnet-ferromagnet lateral junctions. Research Square, Preprint. Jun. 15, 2021; version 1:25 pages. [https://doi.org/10.21203/rs.3.rs0596109/v1].

\* cited by examiner

MAGNETIC MEMORY DEVICES

CROSS-REFERENCE TO RELATED APPLICATION

This U.S. non-provisional patent application claims priority under 35 U.S.C. § 119 to Korean Patent Application No. 10-2021-0164209, filed on Nov. 25, 2021, in the Korean Intellectual Property Office, and the entire contents of the above-identified application are hereby incorporated by reference.

BACKGROUND

The present disclosure relates to magnetic memory devices, and more particularly, to magnetic memory devices that use movement phenomena of magnetic domain walls.

High-speed and low-voltage memory devices have been increasingly demanded to realize high-speed and low-power electronic devices that include such memory devices. Magnetic memory devices have been studied as memory devices that potentially satisfy these demands. In particular, magnetic memory devices have been spotlighted as potential next-generation memory devices because of their high-speed operation characteristics and/or non-volatile characteristics. In particular, new magnetic memory devices using movement phenomena of magnetic domain walls of magnetic materials have been studied and developed.

SUMMARY

Some embodiments of the inventive concepts of the present disclosure may provide a magnetic memory device capable of controlling more stably a position of a magnetic domain wall in a magnetic track including a synthetic antiferromagnetic structure.

Some embodiments of the inventive concepts of the present disclosure may also provide a magnetic memory device capable of reducing a current density for moving a magnetic domain wall in a magnetic track including a synthetic antiferromagnetic structure.

In some embodiments, a magnetic memory device may include a magnetic track that extends in a first direction. The magnetic track may include a lower magnetic layer that extends in the first direction, an upper magnetic layer that extends in the first direction on the lower magnetic layer, a spacer layer that extends in the first direction between the lower magnetic layer and the upper magnetic layer, and a non-magnetic pattern that penetrates the upper magnetic layer and is on the spacer layer. The non-magnetic pattern may have a first junction surface that is in contact with a first portion of the upper magnetic layer, and a second junction surface that is in contact with a second portion of the upper magnetic layer. The lower magnetic layer and the upper magnetic layer may be antiferromagnetically coupled to each other by the spacer layer.

In some embodiments, a magnetic memory device may include a conductive line that extends in a first direction, and a magnetic track that extends in the first direction on the conductive line. The magnetic track may include a lower magnetic layer, a spacer layer and an upper magnetic layer, which are sequentially stacked on the conductive line in a second direction perpendicular to the first direction, and a non-magnetic pattern that penetrates the upper magnetic layer and is on the spacer layer. The non-magnetic pattern may have a first junction surface that is in contact with a first portion of the upper magnetic layer, and a second junction surface that is in contact with a second portion of the upper magnetic layer. The non-magnetic pattern may vertically overlap with a portion of the lower magnetic layer in the second direction, and the lower magnetic layer and the upper magnetic layer may be antiferromagnetically coupled to each other by the spacer layer.

In some embodiments, a magnetic memory device may include a conductive line that extends in a first direction; and a lower magnetic layer, a spacer layer, and an upper magnetic layer that are sequentially stacked on the conductive line in a second direction perpendicular to the first direction, the lower magnetic layer and the upper magnetic layer antiferromagnetically coupled to each other by the spacer layer; and a non-magnetic pattern that is within the upper magnetic layer and on the spacer layer, the non-magnetic pattern comprising a first junction surface that is in contact with a first portion of the upper magnetic layer; and a second junction surface that is in contact with a second portion of the upper magnetic layer. The non-magnetic pattern may vertically overlap with a lower magnetic domain wall in the lower magnetic layer.

DETAILED DESCRIPTION

Some examples of embodiments of the inventive concepts will now be described more fully with reference to the accompanying drawings.

Figure 1:
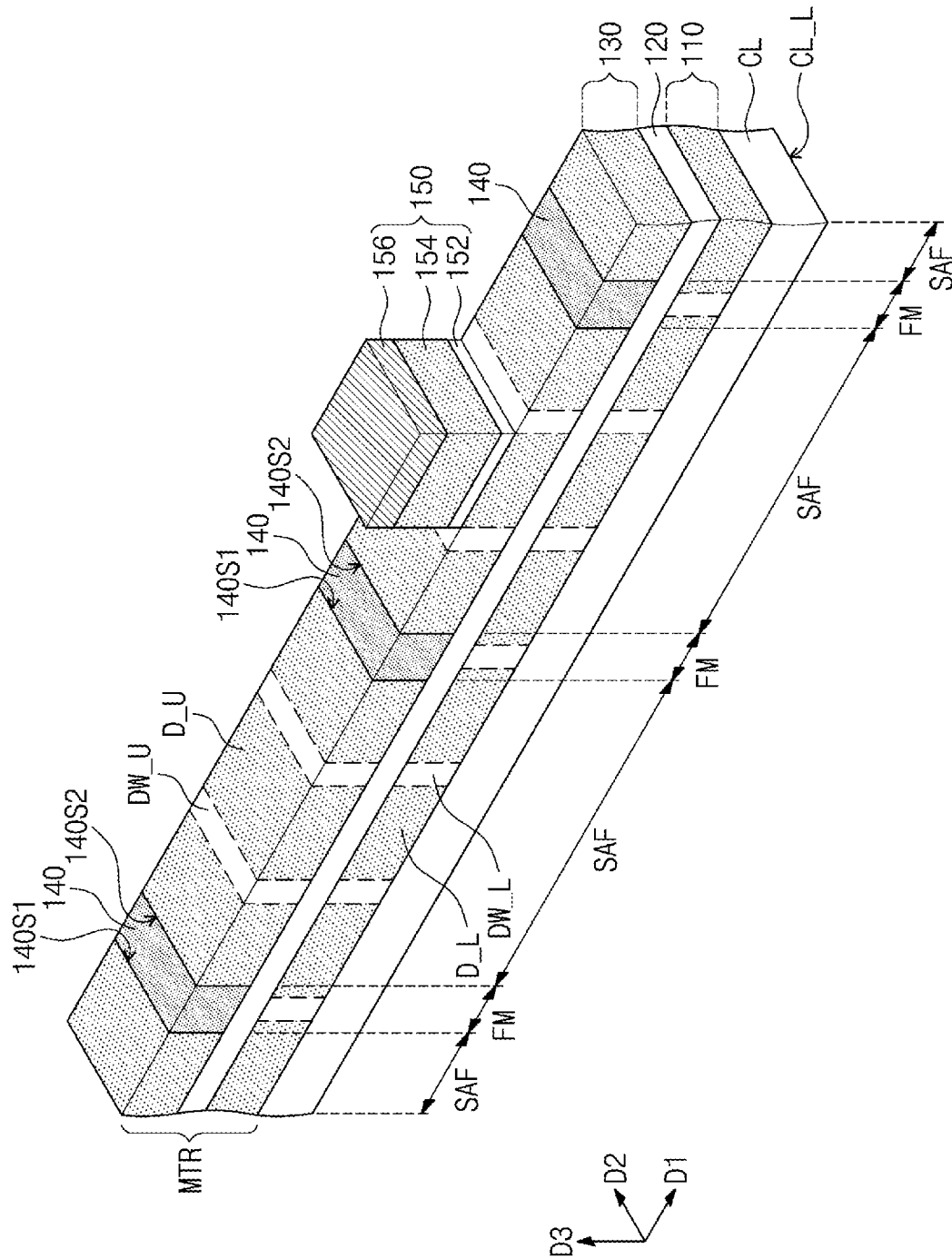
FIG. 1 is a perspective view schematically illustrating a magnetic memory device according to some embodiments of the inventive concepts.

FIG. 1 is a perspective view schematically illustrating a magnetic memory device according to some embodiments of the inventive concepts.

Referring to FIG. 1, a magnetic memory device may include a conductive line CL, a magnetic track MTR on the conductive line CL, and a read/write unit 150 on the magnetic track MTR. Each of the conductive line CL and the magnetic track MTR may extend in a first direction D1 and may have a line shape in which a length in the first direction D1 is greater than a width in a second direction D2 perpendicular to the first direction D1. The first direction D1 and the second direction D2 may be parallel to a plane (e.g., a plane that includes a bottom surface CL_L of the conductive line CL) and may be perpendicular to each other. The magnetic track MTR may be stacked on the conductive line CL in a third direction D3 that is perpendicular to the first direction D1 and the second direction D2. The third direction D3 may be perpendicular to the plane discussed above (e.g., the plane that includes the bottom surface CL_L of the conductive line CL). The read/write unit 150 may be adjacent to a portion of the magnetic track MTR.

The conductive line CL may be configured to generate spin-orbit torque by a current flowing therethrough. The conductive line CL may include a material capable of generating a spin hall effect or a Rashba effect by a current flowing in the first direction D1 or an opposite direction to the first direction D1 in the conductive line CL. The conductive line CL may include a heavy metal having an atomic number of 30 or more and may include, as examples, iridium (Ir), ruthenium (Ru), tantalum (Ta), platinum (Pt), palladium (Pd), bismuth (Bi), titanium (Ti), or tungsten (W).

The magnetic track MTR may include a lower magnetic layer 110, a spacer layer 120 and an upper magnetic layer 130, which are sequentially stacked on the conductive line CL in the third direction D3. The lower magnetic layer 110 may be between the conductive line CL and the spacer layer 120, and the spacer layer 120 may be between the lower magnetic layer 110 and the upper magnetic layer 130. Each of the lower magnetic layer 110, the spacer layer 120 and the upper magnetic layer 130 may have a line shape extending in the first direction D1.

The conductive line CL and the magnetic track MTR may have straight line shapes extending in the first direction D1, but embodiments of the inventive concepts are not limited thereto. In some embodiments, the conductive line CL and the magnetic track MTR may have U-shaped line shapes.

The lower magnetic layer 110 may include lower magnetic domains D_L arranged in the first direction D1, and lower magnetic domain walls DW_L between the lower magnetic domains D_L. Each of the lower magnetic domains D_L may be a region in the lower magnetic layer 110 in which magnetic moments are aligned in a certain direction, and each of the lower magnetic domain walls DW_L may be a region in which directions of magnetic moments are changed between the lower magnetic domains D_L. The lower magnetic domains D_L and the lower magnetic domain walls DW_L may be alternately arranged in the first direction D1.

The upper magnetic layer 130 may include upper magnetic domains D_U arranged in the first direction D1, and upper magnetic domain walls DW_U between the upper magnetic domains D_U. Each of the upper magnetic domains D_U may be a region in the upper magnetic layer 130 in which magnetic moments are aligned in a certain direction, and each of the upper magnetic domain walls DW_U may be a region in which directions of magnetic moments are changed between the upper magnetic domains D_U. The upper magnetic domains D_U and the upper magnetic domain walls DW_U may be alternately arranged in the first direction D1. The upper magnetic domains D_U may vertically overlap with the lower magnetic domains D_L, respectively, in the third direction D3.

The lower magnetic layer 110 and the upper magnetic layer 130 may be antiferromagnetically coupled to each other by the spacer layer 120. A magnetic moment of the upper magnetic layer 130 may be greater than a magnetic moment of the lower magnetic layer 110. Each of the lower magnetic layer 110 and the upper magnetic layer 130 may include a magnetic element and may include at least one of, as examples, cobalt (Co), iron (Fe), or nickel (Ni). The spacer layer 120 may include a non-magnetic metal and may include, as examples, ruthenium (Ru), iridium (Ir), tungsten (W), tantalum (Ta), or any alloy thereof.

The magnetic track MTR may further include at least one non-magnetic pattern 140 in the upper magnetic layer 130. The non-magnetic pattern 140 may penetrate the upper magnetic layer 130 and may be on the spacer layer 120. The non-magnetic pattern 140 may be in contact with a top surface of the spacer layer 120. The non-magnetic pattern 140 may be between a pair of upper magnetic domains D_U, adjacent to each other in the first direction D1, of the upper magnetic domains D_U in the upper magnetic layer 130. The non-magnetic pattern 140 may vertically overlap (e.g., in the third direction D3) with a portion of the lower magnetic layer 110 in the third direction D3. For example, the non-magnetic pattern 140 may vertically overlap with a corresponding lower magnetic domain wall DW_L of the lower magnetic domain walls DW_L in the lower magnetic layer 110. The spacer layer 120 may be between the lower magnetic layer 110 and the upper magnetic layer 130 and may extend between the non-magnetic pattern 140 and the lower magnetic layer 110. The non-magnetic pattern 140 may include a metal oxide. The non-magnetic pattern 140 may include a same magnetic element as a magnetic element in the upper magnetic layer 130 and may further include oxygen.

The at least one non-magnetic pattern 140 may be a plurality of non-magnetic patterns 140. The plurality of non-magnetic patterns 140 may be spaced apart from each other in the first direction D1 in the upper magnetic layer 130. Each of the plurality of non-magnetic patterns 140 may penetrate the upper magnetic layer 130 and may be on the spacer layer 120. Each of the plurality of non-magnetic patterns 140 may be in contact with the top surface of the spacer layer 120. Each of the plurality of non-magnetic patterns 140 may be between a pair of upper magnetic domains D_U, adjacent to each other in the first direction D1, of the upper magnetic domains D_U in the upper magnetic layer 130. Each of the plurality of non-magnetic patterns 140 may vertically overlap (e.g., in the third direction D3) with a corresponding portion of the lower magnetic layer 110 in the third direction D3 and, for example, may vertically overlap with a corresponding lower magnetic domain wall DW_L of the lower magnetic domain walls DW_L in the lower magnetic layer 110. The spacer layer 120 may be between the lower magnetic layer 110 and the upper magnetic layer 130 and may extend between the plurality of non-magnetic patterns 140 and the lower magnetic layer 110.

The non-magnetic pattern 140 may have a first surface 140S1 and a second surface 140S2, which are opposite to each other in the first direction D1. The first surface 140S1 of the non-magnetic pattern 140 may be in contact with a portion of the upper magnetic layer 130 (e.g., a first portion of the upper magnetic layer 130), and the second surface 140S2 of the non-magnetic pattern 140 may be in contact with another portion of the upper magnetic layer 130 (e.g., a second portion of the upper magnetic layer 130). The first surface 140S1 of the non-magnetic pattern 140 may be referred to as a first junction surface 140S1 between the non-magnetic pattern 140 and the upper magnetic layer 130, and the second surface 140S2 of the non-magnetic pattern 140 may be referred to as a second junction surface 140S2 between the non-magnetic pattern 140 and the upper magnetic layer 130.

The magnetic track MTR may include synthetic antiferromagnetic regions SAF adjacent to each other in the first direction D1, and a ferromagnetic region FM between the synthetic antiferromagnetic regions SAF. The synthetic antiferromagnetic regions SAF may be regions in which the lower magnetic layer 110 and the upper magnetic layer 130 are antiferromagnetically coupled to each other by the spacer layer 120. The ferromagnetic region FM may include the non-magnetic pattern 140, and the portion of the lower magnetic layer 110 which vertically overlaps with the non-magnetic pattern 140. The magnetic track MTR may include a synthetic antiferromagnet-ferromagnet-synthetic antiferromagnet (SAF-FM-SAF) bi-lateral junction structure in which the synthetic antiferromagnetic regions SAF and the ferromagnetic region FM therebetween are joined to each other in the first direction D1. The first junction surface 140S1 between the non-magnetic pattern 140 and the upper magnetic layer 130 may be referred to as a first junction surface 140S1 between one of the synthetic antiferromagnetic regions SAF and the ferromagnetic region FM, and the second junction surface 140S2 between the non-magnetic pattern 140 and the upper magnetic layer 130 may be referred to as a second junction surface 140S2 between the other of the synthetic antiferromagnetic regions SAF and the ferromagnetic region FM. In some embodiments, the magnetic track MTR may have a structure in which a plurality of synthetic antiferromagnetic regions SAF and a plurality of ferromagnetic regions FM are alternately arranged in the first direction D1.

The read/write unit 150 may be on at least one synthetic antiferromagnetic region SAF of the synthetic antiferromagnetic regions SAF of the magnetic track MTR. The read/write unit 150 may include a GMR sensor using a giant magneto resistance effect or a TMR sensor using a tunnel magneto resistance effect. For example, the read/write unit 150 may include a magnetic pattern 154 on the upper magnetic layer 130, a tunnel barrier pattern 152 between the upper magnetic layer 130 and the magnetic pattern 154, and an electrode pattern 156 on the magnetic pattern 154. The magnetic pattern 154 may be between the tunnel barrier pattern 152 and the electrode pattern 156. The magnetic pattern 154 may include at least one of cobalt (Co), iron (Fe), or nickel (Ni). The tunnel barrier pattern 152 may include at least one of magnesium (Mg) oxide, titanium (Ti) oxide, aluminum (Al) oxide, magnesium-zinc (Mg—Zn) oxide, or magnesium-boron (Mg—B) oxide. The electrode pattern 156 may include a conductive material and may include, for example, a metal (e.g., copper, tungsten, or aluminum) and/or a metal nitride (e.g., tantalum nitride, titanium nitride, or tungsten nitride).

The read/write unit 150 may vertically overlap (e.g., in the third direction D3) with a corresponding upper magnetic domain D_U of the upper magnetic domains D_U in the upper magnetic layer 130 and a corresponding lower magnetic domain D_L of the lower magnetic domains D_L in the lower magnetic layer 110.

Figure 2:
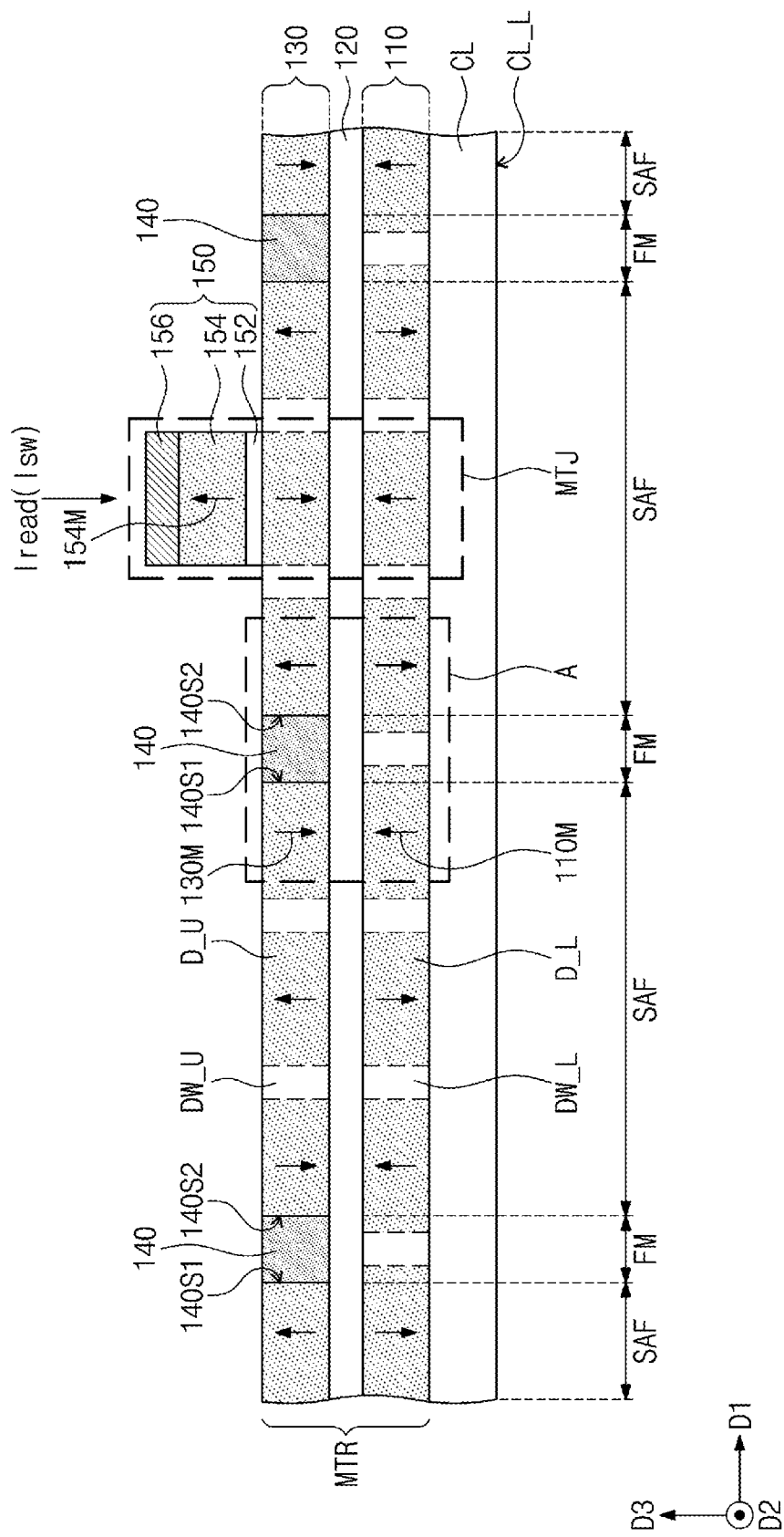
FIG. 2 is a cross-sectional view illustrating a magnetic memory device according to some embodiments of the inventive concepts
Figure 3:
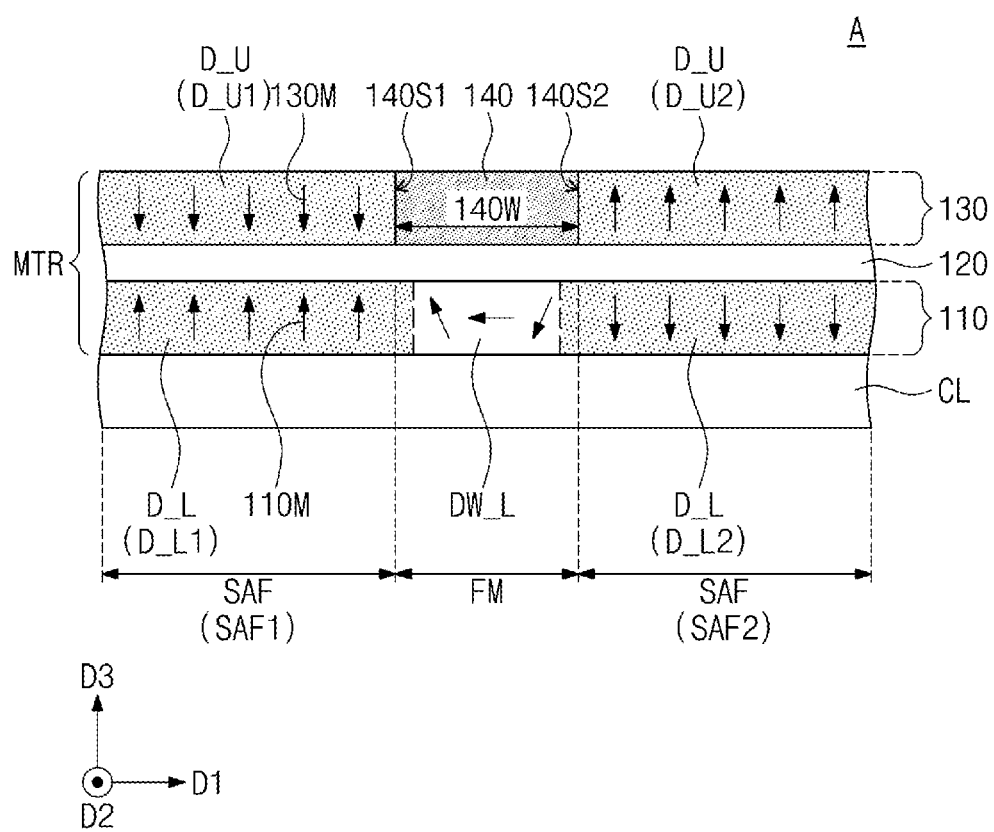
FIG. 3 is an enlarged view of a portion 'A' of FIG. 2.

FIG. 2 is a cross-sectional view illustrating a magnetic memory device according to some embodiments of the inventive concepts, and FIG. 3 is an enlarged view of a portion 'A' of FIG. 2. Hereinafter, the descriptions to the same features as mentioned with reference to FIG. 1 will be omitted for the purpose of ease and convenience in explanation.

Referring to FIGS. 2 and 3, the lower magnetic domains D_L in the lower magnetic layer 110 and the upper magnetic domains D_U in the upper magnetic layer 130 may have perpendicular magnetic anisotropy (PMA). Each of the lower magnetic domains D_L in the lower magnetic layer 110 may have a magnetization direction 110M substantially perpendicular to an interface between the lower magnetic layer 110 and the spacer layer 120, and the magnetization directions 110M of lower magnetic domains D_L adjacent directly to each other may be opposite to each other. Each of the lower magnetic domain walls DW_L may define a boundary between the adjacent lower magnetic domains D_L having the magnetization directions 110M opposite to each other. Each of the upper magnetic domains D_U in the upper magnetic layer 130 may have a magnetization direction 130M substantially perpendicular to an interface between the upper magnetic layer 130 and the spacer layer 120, and the magnetization directions 130M of upper magnetic domains D_U adjacent directly to each other may be opposite to each other. Each of the upper magnetic domain walls DW_U may define a boundary between the adjacent upper magnetic domains D_U having the magnetization directions 130M opposite to each other.

The upper magnetic domains D_U may vertically overlap with the lower magnetic domains D_L in the third direction D3, respectively, and the upper magnetic domains D_U and the lower magnetic domains D_L may be antiferromagnetically coupled to each other by the spacer layer 120. The magnetization direction 130M of each of the upper magnetic domains D_U may be antiparallel to the magnetization direction 110M of a corresponding lower magnetic domain D_L of the lower magnetic domains D_L. In the synthetic antiferromagnetic regions SAF of the magnetic track MTR, the upper magnetic domains D_U and the lower magnetic domains D_L may be antiferromagnetically coupled to each other by the spacer layer 120.

The non-magnetic pattern 140 may vertically overlap with a portion of the lower magnetic layer 110 in the third direction D3. The non-magnetic pattern 140 and the portion of the lower magnetic layer 110 may constitute the ferromagnetic region FM of the magnetic track MTR. At least one lower magnetic domain wall DW_L of the lower magnetic domain walls DW_L may be in the portion of the lower magnetic layer 110 and may vertically overlap with the non-magnetic pattern 140 in the third direction D3.

The non-magnetic pattern 140 may have a width 140W in the first direction D1. The width 140W of the non-magnetic pattern 140 may be equal to or greater than a width of each of the lower magnetic domain walls DW_L in the first direction D1. In some embodiments, the width 140W of the non-magnetic pattern 140 may be substantially equal to the width of each of the lower magnetic domain walls DW_L in the first direction D1. In this case, one lower magnetic domain wall DW_L of the lower magnetic domain walls DW_L may be in the portion of the lower magnetic layer 110 and may vertically overlap with the non-magnetic pattern 140 in the third direction D3. For example, the width 140W of the non-magnetic pattern 140 may range from about 10 nm to about 20 nm.

When a plurality of non-magnetic patterns 140 is provided, each of the plurality of non-magnetic patterns 140 may vertically overlap with a corresponding portion of the lower magnetic layer 110. Each of the plurality of non-magnetic patterns 140 and the corresponding portion of the lower magnetic layer 110 may constitute the ferromagnetic region FM of the magnetic track MTR. At least one lower magnetic domain wall DW_L of the lower magnetic domain walls DW_L may be in the corresponding portion of the lower magnetic layer 110 and may vertically overlap with a corresponding one of the plurality of non-magnetic patterns 140 in the third direction D3. The width 140W of each of the plurality of non-magnetic patterns 140 may be equal to or greater than the width of each of the lower magnetic domain walls DW_L in the first direction D1. In some embodiments, the width 140W of each of the plurality of non-magnetic patterns 140 may be substantially equal to the width of each of the lower magnetic domain walls DW_L in the first direction D1. In this case, one lower magnetic domain wall DW_L of the lower magnetic domain walls DW_L may be in the corresponding portion of the lower magnetic layer 110 and may vertically overlap with the corresponding one of the plurality of non-magnetic patterns 140 in the third direction D3.

When a current flows in the first direction D1 or the opposite direction to the first direction D1 in the conductive line CL, the lower magnetic domain walls DW_L in the lower magnetic layer 110 may move in the first direction D1. The movement of the lower magnetic domain walls DW_L may be due to spin-orbit torque and Dzyaloshinskii-Moriya interaction (DMI) generated at an interface between the conductive line CL and the lower magnetic layer 110. A movement direction of the lower magnetic domain walls DW_L may be dependent on chirality of the lower magnetic domain walls DW_L. Since the lower magnetic domain walls DW_L in the lower magnetic layer 110 move in the first direction D1, the upper magnetic domain walls DW_U in the upper magnetic layer 130 may also move in the first direction D1. The movement of the upper magnetic domain walls DW_U may be due to the antiferromagnetic coupling between the lower magnetic layer 110 and the upper magnetic layer 130.

The magnetic pattern 154 of the read/write unit 150 may have perpendicular magnetic anisotropy (PMA). The magnetic pattern 154 may have a magnetization direction 154M that is substantially perpendicular to an interface between the magnetic pattern 154 and the tunnel barrier pattern 152, and the magnetization direction 154M of the magnetic pattern 154 may be fixed in one direction. The magnetization directions 130M of the upper magnetic domains D_U in the upper magnetic layer 130 and the magnetization directions 110M of the lower magnetic domains D_L in the lower magnetic layer 110 may be changeable to be parallel or antiparallel to the magnetization direction 154M of the magnetic pattern 154.

The magnetic pattern 154 may vertically overlap (e.g., in the third direction D3) with a corresponding upper magnetic domain D_U of the upper magnetic domains D_U and a corresponding lower magnetic domain D_L of the lower magnetic domains D_L. The magnetic pattern 154, the corresponding upper magnetic domain D_U and the corresponding lower magnetic domain D_L, which vertically overlap with each other, may constitute a magnetic tunnel junction MTJ. The magnetic pattern 154 may be a pinned layer having the magnetization direction 154M fixed in one direction, and the corresponding upper magnetic domain D_U and the corresponding lower magnetic domain D_L may be antiferromagnetically coupled to each other to constitute a free layer having a synthetic antiferromagnetic structure.

In a read operation, a read current Iread may flow through the magnetic tunnel junction MTJ. A resistance state of the magnetic tunnel junction MTJ may be detected by the read current Iread. Whether the magnetic tunnel junction MTJ is in a high-resistance state or a low-resistance state may be detected by the read current Iread. Data (0 or 1) stored in the free layer may be detected from the resistance state of the magnetic tunnel junction MTJ. In a write operation, a write current Isw may flow through the magnetic tunnel junction MTJ. A magnitude of the write current Isw may be greater than a magnitude of the read current Iread. The magnetization direction 130M of the corresponding upper magnetic domain D_U may be switched by spin transfer torque generated by the write current Isw. The magnetization direction 130M of the corresponding upper magnetic domain D_U may be switched to be parallel or antiparallel to the magnetization direction 154M of the magnetic pattern 154, by the spin transfer torque generated by the write current Isw. The magnetization direction 1 0M of the corresponding lower magnetic domain D_L may be switched to be antiparallel to the magnetization direction 130M of the corresponding upper magnetic domain D_U, by the antiferromagnetic coupling between the corresponding upper magnetic domain D_U and the corresponding lower magnetic domain D_L.

In some embodiments, each of the lower magnetic layer 110, the upper magnetic layer 130 and the magnetic pattern 154 may include at least one of cobalt (Co), iron (Fe), or nickel (Ni) and may further include at least one non-magnetic material such as boron (B), zinc (Zn), aluminum (Al), titanium (Ti), ruthenium (Ru), tantalum (Ta), silicon (Si), silver (Ag), gold (Au), copper (Cu), carbon (C), and/or nitrogen (N). For example, each of the lower magnetic layer 110, the upper magnetic layer 130 and the magnetic pattern 154 may include at least one of a perpendicular magnetic material (e.g., CoFeTb, CoFeGd, or CoFeDy), a perpendicular magnetic material having a $L1_0$ structure, a CoPt alloy having a hexagonal close packed (HCP) lattice structure, or a perpendicular magnetic structure. The perpendicular magnetic material having the $L1_0$ structure may include at least one of FePt having the $L1_0$ structure, FePd having the $L1_0$ structure, CoPd having the $L1_0$ structure, or CoPt having the $L1_0$ structure. The perpendicular magnetic structure may include magnetic layers and non-magnetic layers, which are alternately and repeatedly stacked. For example, the perpendicular magnetic structure may include at least one of (Co/Pt)n, (CoFe/Pt)n, (CoFe/Pd)n, (Co/Pd)n, (Co/Ni)n, (CoNi/Pt)n, (CoCr/Pt)n, or (CoCr/Pd)n, where 'n' denotes the number of bilayers. In some embodiments, each of the lower magnetic layer 110, the upper magnetic layer 130 and the magnetic pattern 154 may include CoFeB or a Co-based Heusler alloy.

Referring to FIG. 3, the magnetic track MTR may include the synthetic antiferromagnetic regions SAF adjacent to each other in the first direction D1, and the ferromagnetic region FM between the synthetic antiferromagnetic regions SAF. One of the synthetic antiferromagnetic regions SAF may be referred to as a first synthetic antiferromagnetic region SAF1, and the other of the synthetic antiferromagnetic regions SAF may be referred to as a second synthetic antiferromagnetic region SAF2. The ferromagnetic region FM may be between the first synthetic antiferromagnetic region SAF1 and the second synthetic antiferromagnetic region SAF2. The first junction surface 140S1 between the non-magnetic pattern 140 and the upper magnetic layer 130 may be referred to as a first junction surface 140S1 between the first synthetic antiferromagnetic region SAF1 and the ferromagnetic region FM, and the second junction surface 140S2 between the non-magnetic pattern 140 and the upper magnetic layer 130 may be referred to as a second junction surface 140S2 between the second synthetic antiferromagnetic region SAF2 and the ferromagnetic region FM.

At least one lower magnetic domain wall DW_L of the lower magnetic domain walls DW_L in the lower magnetic layer 110 may be in the ferromagnetic region FM and may vertically overlap with the non-magnetic pattern 140. Lower magnetic domains D_L, adjacent to each other in the first direction D1, of the lower magnetic domains D_L in the lower magnetic layer 110 may be in the synthetic antiferromagnetic regions SAF, respectively. The adjacent lower magnetic domains D_L may include a first lower magnetic domain D_L1 in the first synthetic antiferromagnetic region SAF1, and a second lower magnetic domain D_L2 in the second synthetic antiferromagnetic region SAF2. The first lower magnetic domain D_L1 and the second lower magnetic domain D_L2 may be directly adjacent to each other in the first direction D1 with the at least one lower magnetic domain wall DW_L interposed therebetween. Magnetization directions 110M of the first lower magnetic domain D_L1 and the second lower magnetic domain D_L2 may be opposite to each other. For example, the magnetization direction 110M of the first lower magnetic domain D_L1 may be an up direction, and the magnetization direction 110M of the second lower magnetic domain D_L2 may be a down direction.

Upper magnetic domains D_U that are adjacent to each other in the first direction D1 in the upper magnetic layer 130 may be in the synthetic antiferromagnetic regions SAF. The adjacent upper magnetic domains D_U may include a first upper magnetic domain D_U1 in the first synthetic antiferromagnetic region SAF1, and a second upper magnetic domain D_U2 in the second synthetic antiferromagnetic region SAF2. The first upper magnetic domain D_U1 and the second upper magnetic domain D_U2 may be adjacent directly to each other in the first direction D1 with the non-magnetic pattern 140 interposed therebetween. The first upper magnetic domain D_U1 and the second upper magnetic domain D_U2 may vertically overlap with the first lower magnetic domain D_L1 and the second lower magnetic domain D_L2 (e.g., in the third direction D3), respectively. Magnetization directions 130M of the first upper magnetic domain D_U1 and the second upper magnetic domain D_U2 may be opposite to each other. For example, the magnetization direction 130M of the first upper magnetic domain D_U1 may be a down direction, and the magnetization direction 130M of the second upper magnetic domain D_U2 may be an up direction. In the synthetic antiferromagnetic regions SAF, the first upper magnetic domain D_U1 and the second upper magnetic domain D_U2 may be antiferromagnetically coupled to the first lower magnetic domain D_L1 and the second lower magnetic domain D_L2 by the spacer layer 120, respectively.

Figure 4A:
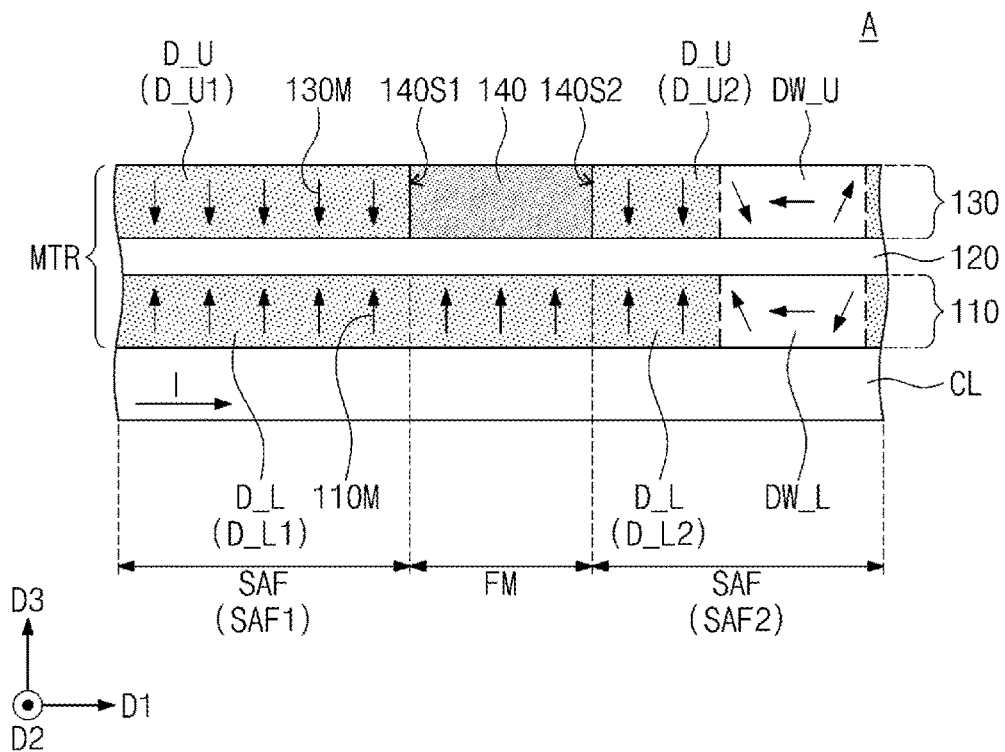
FIGS. 4A and 4B are enlarged views corresponding to the portion 'A' of FIG. 2 to illustrate movement of a magnetic domain wall by applying a current in a magnetic track of a magnetic memory device according to some embodiments of the inventive concepts.
Figure 4B:
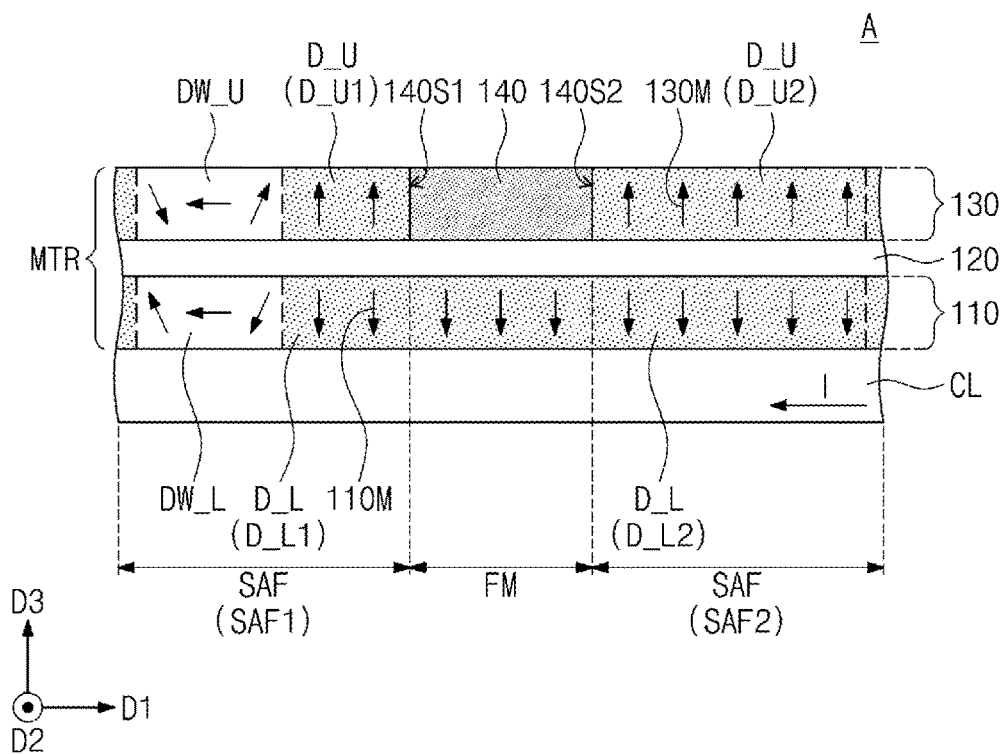

FIGS. 4A and 4B are enlarged views corresponding to the portion 'A' of FIG. 2 to illustrate movement of a magnetic domain wall by applying a current in a magnetic track of a magnetic memory device according to some embodiments of the inventive concepts.

Referring to FIGS. 3 and 4A, when a current I flows in the conductive line CL in the first direction D1, the at least one lower magnetic domain wall DW_L in the ferromagnetic region FM may move into the second synthetic antiferromagnetic region SAF2 in the first direction D1. Since the at least one lower magnetic domain wall DW_L moves, a magnetization direction 110M of the lower magnetic layer 110 in the ferromagnetic region FM may be aligned in the up direction, and the magnetization direction 110M of the second lower magnetic domain D_L2 in the second synthetic antiferromagnetic region SAF2 may be reversed to the up direction. In addition, the magnetization direction 130M of the second upper magnetic domain D_U2 in the second synthetic antiferromagnetic region SAF2 may be reversed to the down direction by the antiferromagnetic coupling between the lower magnetic layer 110 and the upper magnetic layer 130. Since the magnetization direction 130M of the second upper magnetic domain D_U2 is reversed, an upper magnetic domain wall DW_U may be formed in the upper magnetic layer 130 in the second synthetic antiferromagnetic region SAF2. The upper magnetic domain wall DW_U may move along with the at least one lower magnetic domain wall DW_L in the first direction D1 by the antiferromagnetic coupling between the lower magnetic layer 110 and the upper magnetic layer 130.

Referring to FIGS. 3 and 4B, when the current I flows in the conductive line CL in the opposite direction to the first direction D1, the at least one lower magnetic domain wall DW_L in the ferromagnetic region FM may move into the first synthetic antiferromagnetic region SAF1 in the opposite direction to the first direction D1. Since the at least one lower magnetic domain wall DW_L moves, a magnetization direction 110M of the lower magnetic layer 110 in the ferromagnetic region FM may be aligned in the down direction, and the magnetization direction 110M of the first lower magnetic domain D_L1 in the first synthetic antiferromagnetic region SAF1 may be reversed to the down direction. In addition, the magnetization direction 130M of the first upper magnetic domain D_U1 in the first synthetic antiferromagnetic region SAF1 may be reversed to the up direction by the antiferromagnetic coupling between the lower magnetic layer 110 and the upper magnetic layer 130. Since the magnetization direction 130M of the first upper magnetic domain D_U1 is reversed, an upper magnetic domain wall DW_U may be formed in the upper magnetic layer 130 in the first synthetic antiferromagnetic region SAF1. The upper magnetic domain wall DW_U may move along with the at least one lower magnetic domain wall DW_L in the opposite direction to the first direction D1 by the antiferromagnetic coupling between the lower magnetic layer 110 and the upper magnetic layer 130.

Figure 5A:
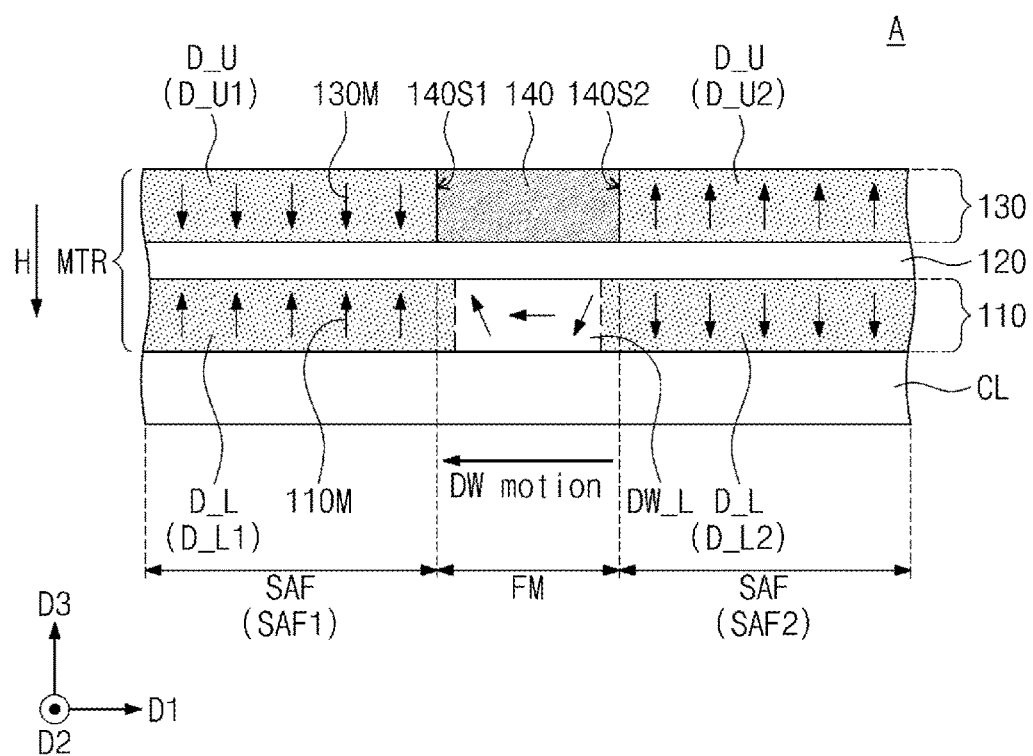
FIGS. 5A and 5B are enlarged views corresponding to the portion 'A' of FIG. 2 to illustrate movement of a magnetic domain wall by an external magnetic field in a magnetic track of a magnetic memory device according to some embodiments of the inventive concepts.
Figure 5B:
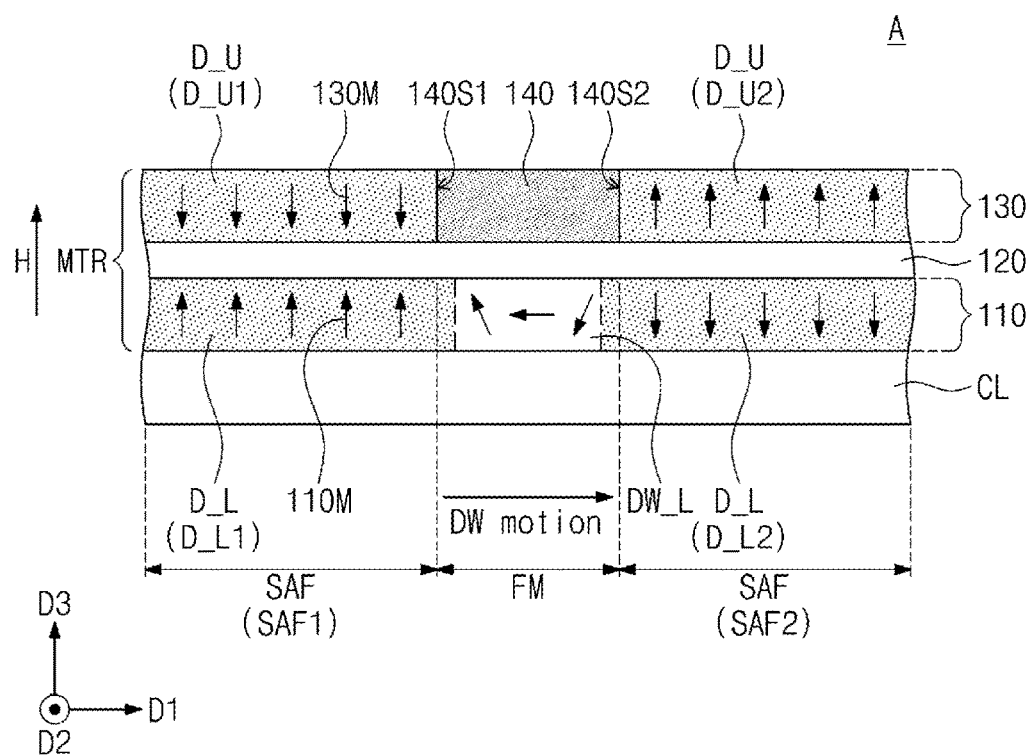

FIGS. 5A and 5B are enlarged views corresponding to the portion 'A' of FIG. 2 to illustrate movement of a magnetic domain wall by an external magnetic field in a magnetic track of a magnetic memory device according to some embodiments of the inventive concepts.

Referring to FIGS. 3 and 5A, when a direction of an external magnetic field H applied to the magnetic track MTR is the down direction, the at least one lower magnetic domain wall DW_L in the ferromagnetic region FM may move in the opposite direction to the first direction D1. The at least one lower magnetic domain wall DW_L may be far away from the second junction surface 140S2 between the second synthetic antiferromagnetic region SAF2 and the ferromagnetic region FM and may be close to the first junction surface 140S1 between the first synthetic antiferromagnetic region SAF1 and the ferromagnetic region FM.

The at least one lower magnetic domain wall DW_L may not be injected into the first synthetic antiferromagnetic region SAF1. For example, a coercivity (Hc) of the synthetic antiferromagnetic regions SAF may be greater than a coercivity (Hc) of the ferromagnetic region FM. Since the synthetic antiferromagnetic regions SAF have the relatively great coercivity (Hc), the magnetization directions 110M and 130M of the lower magnetic layer 110 (e.g., the first and second lower magnetic domains D_L1 and D_L2) and the upper magnetic layer 130 (e.g., the first and second upper magnetic domains D_U1 and D_U2) in the synthetic antiferromagnetic regions SAF may not be reversed by the external magnetic field H. In addition, a magnetic moment of the upper magnetic layer 130 may be greater than a magnetic moment of the lower magnetic layer 110. Since the direction of the external magnetic field H is the same direction (e.g., the down direction) as the magnetization direction 130M of the first upper magnetic domain D_U1 in the first synthetic antiferromagnetic region SAF1, the antiferromagnetic coupling between the first upper magnetic domain D_U1 and the first lower magnetic domain D_L1 in the first synthetic antiferromagnetic region SAF1 may be stable with respect to the external magnetic field H. Thus, the at least one lower magnetic domain wall DW_L in the ferromagnetic region FM may not be injected into the first synthetic antiferromagnetic region SAF1 but may be trapped in the lower magnetic layer 110 in the ferromagnetic region FM.

Referring to FIGS. 3 and 5B, when the direction of the external magnetic field H applied to the magnetic track MTR is the up direction, the at least one lower magnetic domain wall DW_L in the ferromagnetic region FM may move in the first direction D1. The at least one lower magnetic domain wall DW_L may be far away from the first junction surface 140S1 between the first synthetic antiferromagnetic region SAF1 and the ferromagnetic region FM and may be close to the second junction surface 140S2 between the second synthetic antiferromagnetic region SAF2 and the ferromagnetic region FM.

The at least one lower magnetic domain wall DW_L may not be injected into the second synthetic antiferromagnetic region SAF2. For example, since the synthetic antiferromagnetic regions SAF have the relatively great coercivity (Hc), the magnetization directions 110M and 130M of the lower magnetic layer 110 (e.g., the first and second lower magnetic domains D_L1 and D_L2) and the upper magnetic layer 130 (e.g., the first and second upper magnetic domains D_U1 and D_U2) in the synthetic antiferromagnetic regions SAF may not be reversed by the external magnetic field H. In addition, the magnetic moment of the upper magnetic layer 130 may be greater than the magnetic moment of the lower magnetic layer 110. Since the direction of the external magnetic field H is the same direction (e.g., the up direction) as the magnetization direction 130M of the second upper magnetic domain D_U2 in the second synthetic antiferromagnetic region SAF2, the antiferromagnetic coupling between the second upper magnetic domain D_U2 and the second lower magnetic domain D_L2 in the second synthetic antiferromagnetic region SAF2 may be stable with respect to the external magnetic field H. Thus, the at least one lower magnetic domain wall DW_L in the ferromagnetic region FM may not be injected into the second synthetic antiferromagnetic region SAF2 but may be trapped in the lower magnetic layer 110 in the ferromagnetic region FM.

As described with reference to FIGS. 3, 4A and 4B, the at least one lower magnetic domain wall DW_L in the ferromagnetic region FM may move into the synthetic antiferromagnetic regions SAF by the current I applied to the conductive line CL. However, as described with reference to FIGS. 3, 5A and 5B, the at least one lower magnetic domain wall DW_L in the ferromagnetic region FM may not move into the synthetic antiferromagnetic regions SAF but may be trapped in the ferromagnetic region FM, when the external magnetic field H is applied to the magnetic track MTR.

According to the inventive concepts, the magnetic track MTR may include the synthetic antiferromagnet-ferromagnet-synthetic antiferromagnet (SAF-FM-SAF) bi-lateral junction structure in which the synthetic antiferromagnetic regions SAF and the ferromagnetic region FM therebetween are joined to each other in the first direction D1. The ferromagnetic region FM may include the non-magnetic pattern 140 and a portion of the lower magnetic layer 110 which vertically overlaps with the non-magnetic pattern 140, and at least one lower magnetic domain wall DW_L may be in the portion of the lower magnetic layer 110 (i.e., in the ferromagnetic region FM). In this case, the at least one lower magnetic domain wall DW_L in the ferromagnetic region FM may move into the synthetic antiferromagnetic regions SAF by the current I applied to the conductive line CL but may not move into the synthetic antiferromagnetic regions SAF by the external magnetic field H applied to the magnetic track MTR. In other words, when the external magnetic field H is applied to the magnetic track MTR, the at least one lower magnetic domain wall DW_L in the ferromagnetic region FM may be trapped in the ferromagnetic region FM. Thus, it may be possible to minimize the influence of an external factor (e.g., the external magnetic field H) on positions of the lower magnetic domain walls DW_L in the lower magnetic layer 110, and the positions of the lower magnetic domain walls DW_L in the lower magnetic layer 110 may be controlled more stably by the current I applied to the conductive line CL. In addition, since the positions of the lower magnetic domain walls DW_L in the lower magnetic layer 110 may be controlled more stably, positions of the upper magnetic domain walls DW_U in the upper magnetic layer 130 may also be controlled more stably due to the antiferromagnetic coupling between the lower magnetic layer 110 and the upper magnetic layer 130.

As a result, the embodiments of the inventive concepts may provide the magnetic memory device capable of stably controlling a position of the magnetic domain wall in the magnetic track MTR including the synthetic antiferromagnetic structure.

Figure 6:
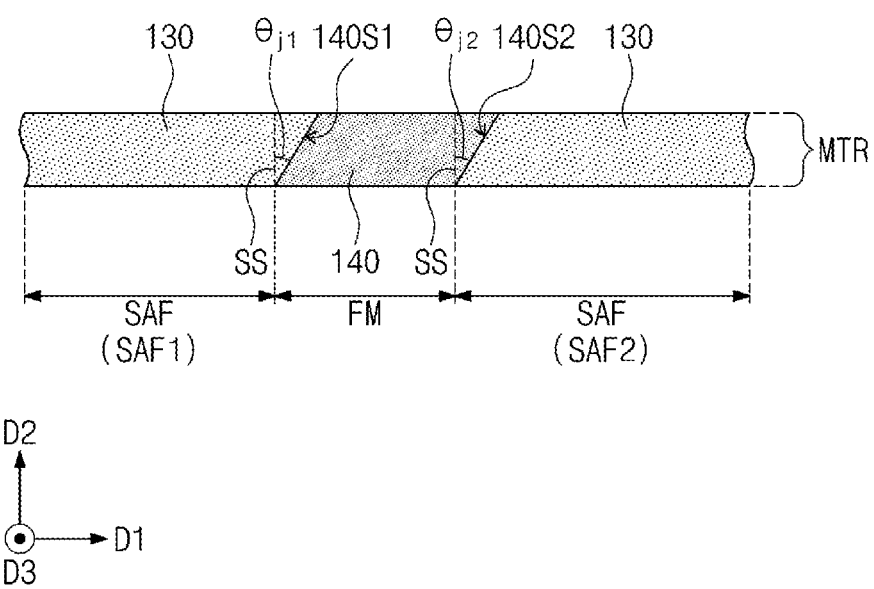
FIG. 6 is a plan view illustrating a portion of a magnetic memory device according to some embodiments of the inventive concepts.

FIG. 6 is a plan view of FIG. 3 to illustrate a portion of a magnetic memory device according to some embodiments of the inventive concepts.

Referring to FIGS. 3 and 6, the first junction surface 140S1 between the non-magnetic pattern 140 and the upper magnetic layer 130 may be referred to as a first junction surface 140S1 between the first synthetic antiferromagnetic region SAF1 and the ferromagnetic region FM, and the second junction surface 140S2 between the non-magnetic pattern 140 and the upper magnetic layer 130 may be referred to as a second junction surface 140S2 between the second synthetic antiferromagnetic region SAF2 and the ferromagnetic region FM.

The first junction surface 140S1 between the first synthetic antiferromagnetic region SAF1 and the ferromagnetic region FM may be inclined at a first angle $\theta_{j1}$ with respect to a reference surface SS perpendicular to the first direction D1, and the second junction surface 140S2 between the second synthetic antiferromagnetic region SAF2 and the ferromagnetic region FM may be inclined at a second angle $\theta_{j2}$ with respect to the reference surface SS. Each of the first angle $\theta_{j1}$ and the second angle $\theta_{j2}$ may be greater than 30 degrees and may be, for example, greater than 30 degrees and less than 90 degrees. Accordingly, in some embodiments and as described with reference to FIGS. 4A and 4B, it may be possible to reduce a current density applied to the conductive line CL to move the at least one lower magnetic domain wall DW_L in the ferromagnetic region FM into the first synthetic antiferromagnetic region SAF1 or the second synthetic antiferromagnetic region SAF2.

According to the present embodiments, it may be possible to provide the magnetic memory device that is capable of reducing the current density for moving the magnetic domain wall in the magnetic track MTR including the synthetic antiferromagnetic structure.

Figure 7A:
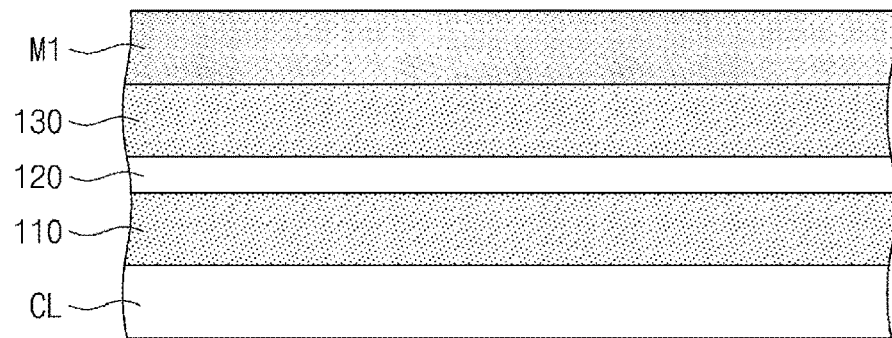
FIGS. 7A to 7C are cross-sectional views corresponding to the portion 'A' of FIG. 2 to illustrate a method of manufacturing a magnetic memory device according to some embodiments of the inventive concepts.
Figure 7B:
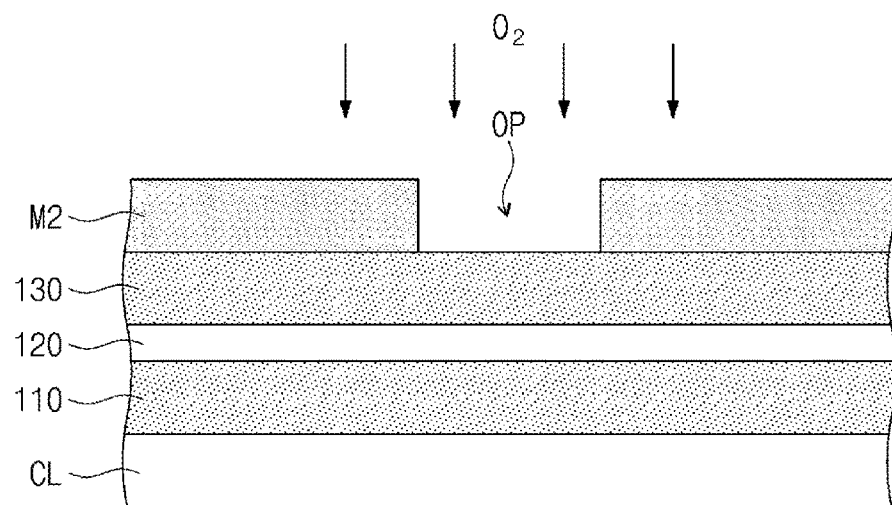
Figure 7C:
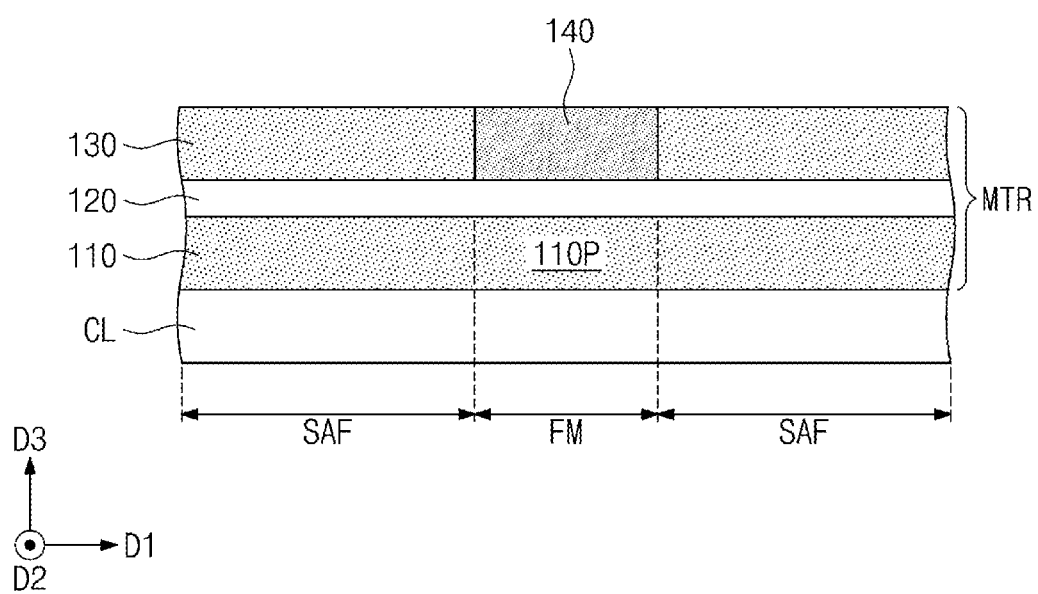

FIGS. 7A to 7C are cross-sectional views corresponding to the portion 'A' of FIG. 2 to illustrate aspects of methods of manufacturing a magnetic memory device according to some embodiments of the inventive concepts. Hereinafter, the descriptions to the same features as mentioned with reference to FIGS. 1 and 2 will be omitted for the purpose of ease and convenience in explanation.

Referring to FIG. 7A, a conductive line CL, a lower magnetic layer 110, a spacer layer 120 and an upper magnetic layer 130 may be formed to extend in the first direction D1. The lower magnetic layer 110, the spacer layer 120 and the upper magnetic layer 130 may be sequentially stacked on the conductive line CL in the third direction D3.

For example, the formation of the conductive line CL, the lower magnetic layer 110, the spacer layer 120 and the upper magnetic layer 130 may include sequentially depositing a conductive layer, a first magnetic layer, a non-magnetic layer and a second magnetic layer, forming a first mask pattern M1 on the second magnetic layer, and sequentially etching the second magnetic layer, the non-magnetic layer, the first magnetic layer and the conductive layer by using the first mask pattern M1 as an etch mask. The conductive layer, the first magnetic layer, the non-magnetic layer and the second magnetic layer may be formed using a chemical vapor deposition (CVD) method and/or a physical vapor deposition (PVD) method and may be formed using, for example, a sputtering deposition method. The first mask pattern M1 may have a line shape extending in the first direction D1 and may be a photoresist pattern or a hard mask pattern. The second magnetic layer, the non-magnetic layer, the first magnetic layer and the conductive layer may be sequentially etched by, for example, an ion beam etching process. The upper magnetic layer 130, the spacer layer 120, the lower magnetic layer 110 and the conductive line CL may be formed by etching the second magnetic layer, the non-magnetic layer, the first magnetic layer and the conductive layer, respectively. The lower magnetic layer 110 and the upper magnetic layer 130 may be antiferromagnetically coupled to each other by the spacer layer 120.

After the formation of the conductive line CL, the lower magnetic layer 110, the spacer layer 120 and the upper magnetic layer 130, the first mask pattern M1 may be removed. The first mask pattern M1 may be removed by, for example, an ashing process and/or a strip process.

Referring to FIG. 7B, a second mask pattern M2 may be formed on the upper magnetic layer 130. The second mask pattern M2 may include an opening OP that exposes a portion of the upper magnetic layer 130. The second mask pattern M2 may be a photoresist pattern or a hard mask pattern. The second mask pattern M2 may include a metal nitride and may include, for example, TaN.

An oxidation process may be performed on the upper magnetic layer 130. The second mask pattern M2 may be used as a mask of the oxidation process. The oxidation process may include, for example, an oxygen plasma treatment.

Referring to FIG. 7C, the portion of the upper magnetic layer 130 that is exposed by the opening OP of the second mask pattern M2 may be oxidized by the oxidation process. Thus, a non-magnetic pattern 140 may be formed in the upper magnetic layer 130. The non-magnetic pattern 140 may include a metal oxide. The non-magnetic pattern 140 may include a same magnetic element as a magnetic element in the upper magnetic layer 130 and may further include oxygen.

The spacer layer 120 may be used as an oxidation stop layer of the oxidation process. Thus, a portion 110P of the lower magnetic layer 110, which vertically overlaps with the non-magnetic pattern 140 (e.g., in the third direction D3), may not be oxidized by the oxidation process but may maintain a ferromagnetic property. The non-magnetic pattern 140 may penetrate the upper magnetic layer 130 so as to be in contact with the spacer layer 120.

After the formation of the non-magnetic pattern 140 by the oxidation process, the second mask pattern M2 may be removed. The second mask pattern M2 may be removed by, for example, an ashing process and/or a strip process.

The lower magnetic layer 110, the spacer layer 120, the upper magnetic layer 130 and the non-magnetic pattern 140 may constitute a magnetic track MTR. The conductive line CL and the magnetic track MTR may have line shapes extending in the first direction D1.

The magnetic track MTR may include synthetic antiferromagnetic regions SAF and a ferromagnetic region FM between the synthetic antiferromagnetic regions SAF. The synthetic antiferromagnetic regions SAF may be regions in which the lower magnetic layer 110 and the upper magnetic layer 130 are antiferromagnetically coupled to each other by the spacer layer 120. The ferromagnetic region FM may include the non-magnetic pattern 140, and the portion 110P of the lower magnetic layer 110 which vertically overlaps with the non-magnetic pattern 140. The magnetic track MTR may include a synthetic antiferromagnet-ferromagnet-synthetic antiferromagnet (SAF-FM-SAF) bi-lateral junction structure in which the synthetic antiferromagnetic regions SAF and the ferromagnetic region FM therebetween are joined to each other in the first direction D1.

Referring again to FIG. 2, a read/write unit 150 may be formed on a corresponding synthetic antiferromagnetic region SAF of the synthetic antiferromagnetic regions SAF of the magnetic track MTR. For example, the formation of the read/write unit 150 may include sequentially forming a tunnel insulating layer, a magnetic layer and an electrode layer on the magnetic track MTR, and etching the tunnel insulating layer, the magnetic layer and the electrode layer. A tunnel barrier pattern 152, a magnetic pattern 154 and an electrode pattern 156 may be formed by etching the tunnel insulating layer, the magnetic layer and the electrode layer, respectively.

Figure 8:
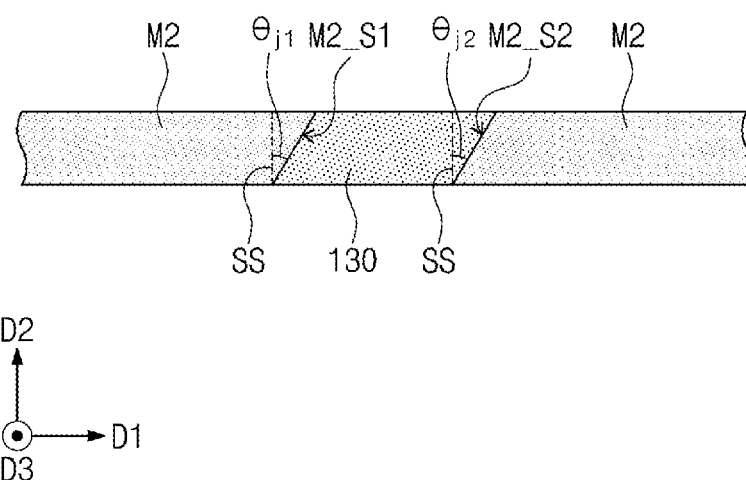
FIG. 8 is a plan view illustrating a method of manufacturing a magnetic memory device according to some embodiments of the inventive concepts.

FIG. 8 is a plan view of FIG. 7B to illustrate a method of manufacturing a magnetic memory device according to some embodiments of the inventive concepts.

Referring to FIGS. 7B and 8, the second mask pattern M2 may include a first inner sidewall M2_S1 and a second inner sidewall M2_S2, which may be exposed by the opening OP. The first inner sidewall M2_S1 and the second inner sidewall M2_S2 may face each other in the first direction D1. In some embodiments, the first inner sidewall M2_S1 may be inclined at a first angle $\theta_{j1}$ with respect to a reference surface SS perpendicular to the first direction D1, and the second inner sidewall M2_S2 may be inclined at a second angle $\theta_{j2}$ with respect to the reference surface SS. Each of the first angle $\theta_{j1}$ and the second angle $\theta_{j2}$ may be greater than 30 degrees and may be, for example, greater than 30 degrees and less than 90 degrees. The second mask pattern M2 may be used as the mask of the oxidation process, and thus side surfaces of the non-magnetic pattern 140 may be formed to be inclined with respect to the reference surface SS. As a result, as described with reference to FIGS. 3 and 6, the first junction surface 140S1 between the first synthetic antiferromagnetic region SAF1 and the ferromagnetic region FM may be formed to be inclined at the first angle $\theta_{j1}$ with respect to the reference surface SS, and the second junction surface 140S2 between the second synthetic antiferromagnetic region SAF2 and the ferromagnetic region FM may be formed to be inclined at the second angle $\theta_{j2}$ with respect to the reference surface SS.

Figure 9:
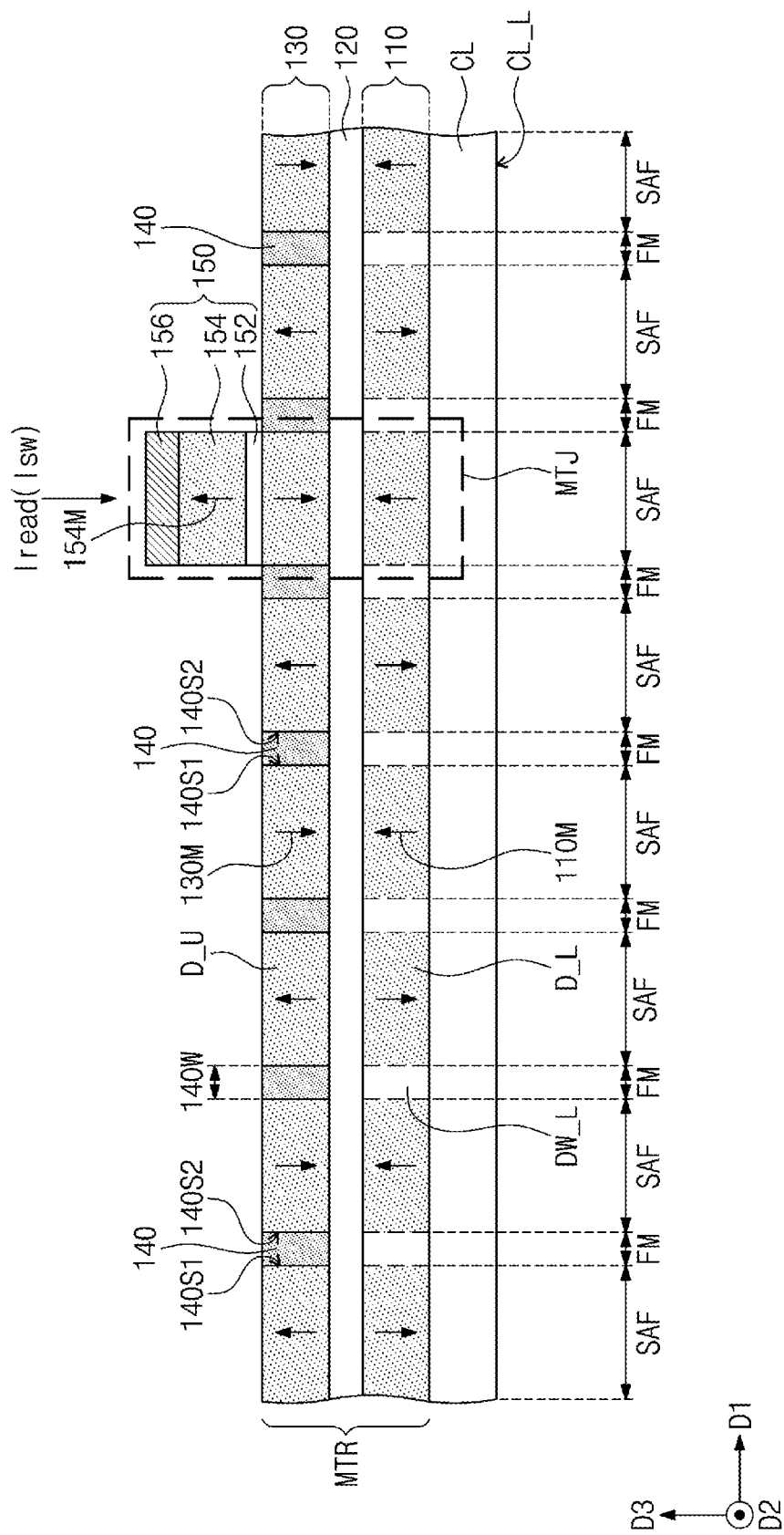
FIG. 9 is a cross-sectional view illustrating a magnetic memory device according to some embodiments of the inventive concepts.

FIG. 9 is a cross-sectional view illustrating a magnetic memory device according to some embodiments of the inventive concepts. Hereinafter, differences between the present embodiments and the above embodiments of FIGS. 1 and 2 will be mainly described for the purpose of ease and convenience in explanation.

Referring to FIG. 9, the magnetic track MTR may include a plurality of non-magnetic patterns 140 in the upper magnetic layer 130. The plurality of non-magnetic patterns 140 may be spaced apart from each other in the first direction D1 in the upper magnetic layer 130. In some embodiments, the upper magnetic domains D_U and the non-magnetic patterns 140 in the upper magnetic layer 130 may be alternately arranged in the first direction D1. Each of the plurality of non-magnetic patterns 140 may have a width 140W in the first direction D1, and the width 140W of each of the plurality of non-magnetic patterns 140 may be substantially equal to a width, in the first direction D1, of each of the upper magnetic domain walls DW_U in the upper magnetic layer 130. Each of the plurality of non-magnetic patterns 140 may vertically overlap with a corresponding portion of the lower magnetic layer 110 in the third direction D3 and, for example, may vertically overlap with a corresponding lower magnetic domain wall DW_L of the lower magnetic domain walls DW_L in the lower magnetic layer 110 (e.g., in the third direction D3).

When a current flows in the first direction D1 or the opposite direction to the first direction D1 in the conductive line CL, the lower magnetic domain walls DW_L in the lower magnetic layer 110 may move in the first direction D1. Thus, magnetization directions 110M of the lower magnetic domains D_L in the lower magnetic layer 110 may be reversed. Magnetization directions 130M of the upper magnetic domains D_U in the upper magnetic layer 130 may be reversed to be antiferromagnetically coupled to the magnetization directions 110M of the lower magnetic domains D_L, by the antiferromagnetic coupling between the lower magnetic layer 110 and the upper magnetic layer 130.

Figure 10:
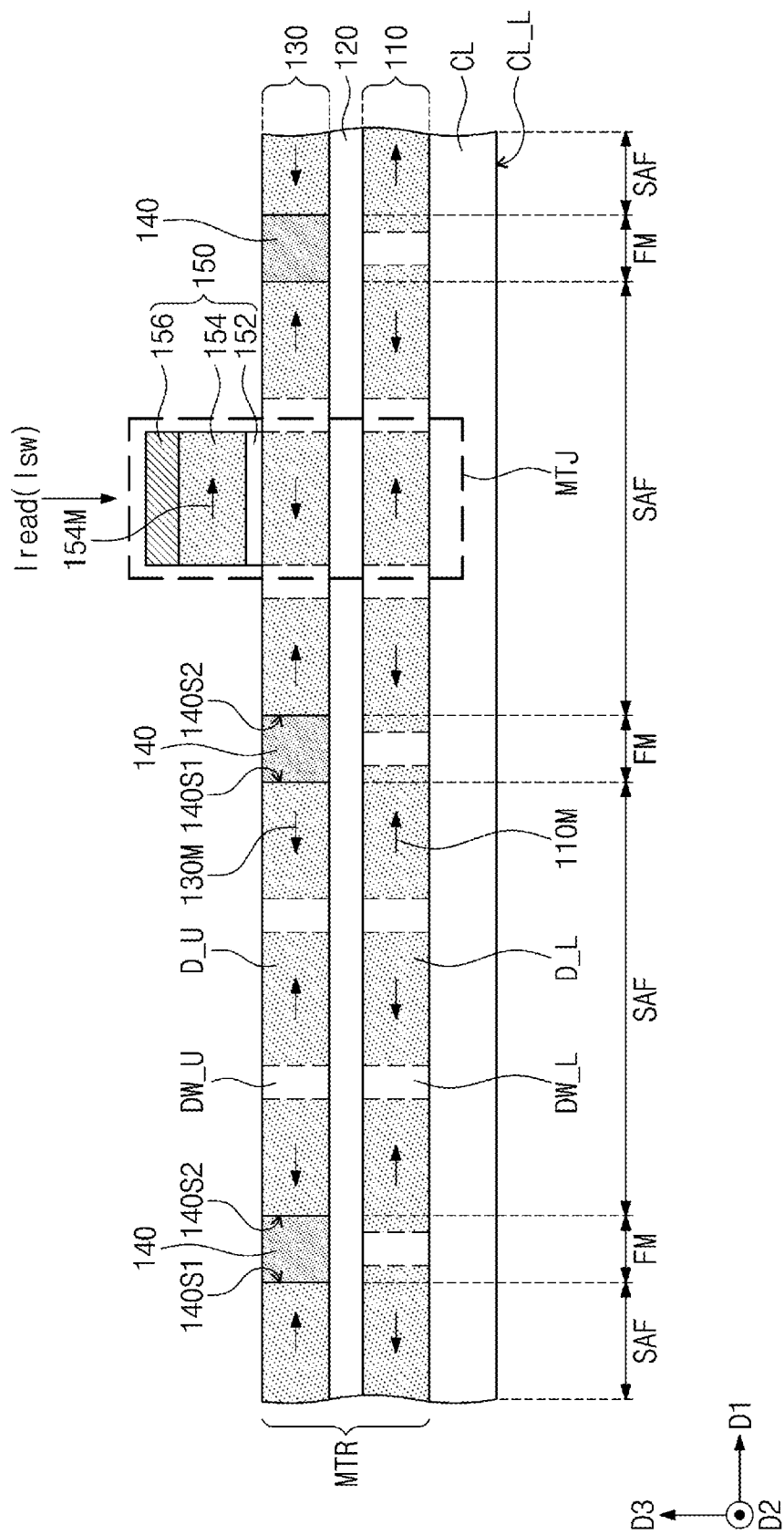
FIG. 10 is a cross-sectional view illustrating a magnetic memory device according to some embodiments of the inventive concepts.

FIG. 10 is a cross-sectional view illustrating a magnetic memory device according to some embodiments of the inventive concepts. Hereinafter, differences between the present embodiments and the above embodiments of FIGS. 1 and 2 will be mainly described for the purpose of ease and convenience in explanation.

Referring to FIG. 10, the lower magnetic domains D_L in the lower magnetic layer 110 and the upper magnetic domains D_U in the upper magnetic layer 130 may have in-plane magnetic anisotropy (IMA). Each of the lower magnetic domains D_L in the lower magnetic layer 110 may have a magnetization direction 110M parallel to an interface between the lower magnetic layer 110 and the spacer layer 120, and magnetization directions 110M of lower magnetic domains D_L adjacent directly to each other may be opposite to each other. Each of the lower magnetic domain walls DW_L may define a boundary between the adjacent lower magnetic domains D_L having the magnetization directions 110M opposite to each other. Each of the upper magnetic domains D_U in the upper magnetic layer 130 may have a magnetization direction 130M parallel to an interface between the upper magnetic layer 130 and the spacer layer 120, and magnetization directions 130M of upper magnetic domains D_U adjacent directly to each other may be opposite to each other. Each of the upper magnetic domain walls DW_U may define a boundary between the adjacent upper magnetic domains D_U having the magnetization directions 130M opposite to each other.

The magnetic pattern 154 of the read/write unit 150 may have in-plane magnetic anisotropy (IMA). The magnetic pattern 154 may have a magnetization direction 154M parallel to an interface between the magnetic pattern 154 and the tunnel barrier pattern 152, and the magnetization direction 154M of the magnetic pattern 154 may be fixed in one direction. The magnetization directions 130M of the upper magnetic domains D_U in the upper magnetic layer 130 and the magnetization directions 110M of the lower magnetic domains D_L in the lower magnetic layer 110 may be changeable to be parallel or antiparallel to the magnetization direction 154M of the magnetic pattern 154.

In some embodiments, each of the lower magnetic layer 110, the upper magnetic layer 130 and the magnetic pattern 154 may include a ferromagnetic material, and the magnetic pattern 154 may further include an antiferromagnetic material for pinning or fixing a magnetization direction of the ferromagnetic material.

According to the inventive concepts, the magnetic track may include the synthetic antiferromagnet-ferromagnet-synthetic antiferromagnet (SAF-FM-SAF) bi-lateral junction structure in which the synthetic antiferromagnetic regions and the ferromagnetic region therebetween are joined to each other in the first direction. The ferromagnetic region may include the non-magnetic pattern and a portion of the lower magnetic layer which vertically overlaps with the non-magnetic pattern, and at least one lower magnetic domain wall may be arranged in the portion of the lower magnetic layer (e.g., in the ferromagnetic region). When an external magnetic field is applied to the magnetic track, the at least one lower magnetic domain wall in the ferromagnetic region may be trapped in the ferromagnetic region. Thus, it may be possible to minimize the influence of an external factor (e.g., the external magnetic field) on a position of a magnetic domain wall in the magnetic track, and the position of the magnetic domain wall in the magnetic track may be stably controlled by a current applied to the conductive line. As a result, it may be possible to provide the magnetic memory device capable of controlling more stably a position of a magnetic domain wall in the magnetic track including the synthetic antiferromagnetic structure.

In addition, a junction surface between each of the synthetic antiferromagnetic regions and the ferromagnetic region may be inclined at an angle with respect to the reference surface perpendicular to the first direction, and the angle may be greater than 30 degrees. In this case, it may be possible to reduce a current density applied to the conductive line to move the at least one lower magnetic domain wall in the ferromagnetic region into the synthetic antiferromagnetic regions. As a result, it may be possible to provide the magnetic memory device capable of reducing a current density for moving a magnetic domain wall in the magnetic track including the synthetic antiferromagnetic structure.

While some example embodiments of the inventive concepts have been particularly shown and described, it will be understood by one of ordinary skill in the art that variations in form and detail may be made therein without departing from the scope of the attached claims.

What is claimed is:

1. A magnetic memory device comprising:
a magnetic track that extends in a first direction,
wherein the magnetic track comprises:
a lower magnetic layer that extends in the first direction;
an upper magnetic layer that extends in the first direction and is on the lower magnetic layer;
a spacer layer that extends in the first direction and is between the lower magnetic layer and the upper magnetic layer; and
a non-magnetic pattern that penetrates the upper magnetic layer and is on the spacer layer, the non-magnetic pattern comprising
a first junction surface that is in contact with a first portion of the upper magnetic layer;
and a second junction surface that is in contact with a second portion of the upper magnetic layer,
wherein the lower magnetic layer and the upper magnetic layer are antiferromagnetically coupled to each other by the spacer layer.

2. The magnetic memory device of claim 1, wherein the first junction surface and the second junction surface of the non-magnetic pattern are on opposite sides of the non-magnetic pattern from each other in the first direction.

3. The magnetic memory device of claim 1, wherein the lower magnetic layer, the spacer layer and the upper magnetic layer are sequentially stacked in a second direction that is perpendicular to the first direction, and
wherein the non-magnetic pattern vertically overlaps with a portion of the lower magnetic layer in the second direction.

4. The magnetic memory device of claim 3, wherein the non-magnetic pattern comprises a metal oxide.

5. The magnetic memory device of claim 3, wherein the non-magnetic pattern includes a first magnetic element and oxygen, and wherein the upper magnetic layer includes the first magnetic element.

6. The magnetic memory device of claim 3, wherein the lower magnetic layer comprises lower magnetic domains and lower magnetic domain walls that are alternately arranged in the first direction,
wherein the upper magnetic layer comprises upper magnetic domains and upper magnetic domain walls that are alternately arranged in the first direction, and
wherein each upper magnetic domain vertically overlaps with a respective lower magnetic domain in the second direction.

7. The magnetic memory device of claim 6, wherein the non-magnetic pattern vertically overlaps with a corresponding lower magnetic domain wall of the lower magnetic domain walls in the second direction.

8. The magnetic memory device of claim 3, wherein the magnetic track includes: synthetic antiferromagnetic regions adjacent to each other in the first direction; and a ferromagnetic region between the synthetic antiferromagnetic regions,
wherein the synthetic antiferromagnetic regions are regions in which the lower magnetic layer and the upper magnetic layer are antiferromagnetically coupled to each other by the spacer layer, and
wherein the ferromagnetic region comprises the non-magnetic pattern and the portion of the lower magnetic layer which vertically overlaps with the non-magnetic pattern.

9. The magnetic memory device of claim 8, wherein the magnetic track includes a synthetic antiferromagnet-ferromagnet-synthetic antiferromagnet (SAF-FM-SAF) bi-lateral junction structure in which the synthetic antiferromagnetic regions and the ferromagnetic region are joined to each other in the first direction.

10. The magnetic memory device of claim 1, further comprising:
a conductive line that is under the magnetic track and that extends in the first direction,
wherein the lower magnetic layer is between the conductive line and the spacer layer.

11. The magnetic memory device of claim 10, wherein the conductive line is configured to generate spin-orbit torque by a current flowing therein.

12. The magnetic memory device of claim 10, wherein the conductive line includes a heavy metal element.

13. The magnetic memory device of claim 10, further comprising:
a read/write unit on the magnetic track,
wherein the read/write unit is adjacent to the upper magnetic layer of the magnetic track.

14. The magnetic memory device of claim 1, wherein a magnetic moment of the upper magnetic layer is greater than a magnetic moment of the lower magnetic layer.

15. A magnetic memory device comprising:
a conductive line that extends in a first direction; and
a magnetic track that extends in the first direction on the conductive line,
wherein the magnetic track comprises:
a lower magnetic layer, a spacer layer and an upper magnetic layer, which are sequentially stacked on the conductive line in a second direction perpendicular to the first direction; and
a non-magnetic pattern that penetrates the upper magnetic layer and is on the spacer layer,
wherein the non-magnetic pattern comprises: a first junction surface that is in contact with a first portion of the upper magnetic layer; and a second junction surface that is in contact with a second portion of the upper magnetic layer,
wherein the non-magnetic pattern vertically overlaps with a portion of the lower magnetic layer in the second direction, and
wherein the lower magnetic layer and the upper magnetic layer are antiferromagnetically coupled to each other by the spacer layer.

16. The magnetic memory device of claim 15, wherein the lower magnetic layer comprises lower magnetic domains and lower magnetic domain walls, which are alternately arranged in the first direction,
wherein the upper magnetic layer comprises upper magnetic domains and upper magnetic domain walls, which are alternately arranged in the first direction, and
wherein the non-magnetic pattern is between a pair of upper magnetic domains that are adjacent to each other in the first direction.

17. The magnetic memory device of claim 16, wherein the non-magnetic pattern is interposed between the pair of upper magnetic domains that are adjacent to each other in the first direction.

18. The magnetic memory device of claim 16, wherein the non-magnetic pattern vertically overlaps with a corresponding lower magnetic domain wall of the lower magnetic domain walls in the second direction.

19. The magnetic memory device of claim 15, wherein a magnetic moment of the upper magnetic layer is greater than a magnetic moment of the lower magnetic layer.

20. A magnetic memory device comprising:
- a conductive line that extends in a first direction; and
- a lower magnetic layer, a spacer layer, and an upper magnetic layer that are sequentially stacked on the conductive line in a second direction perpendicular to the first direction, the lower magnetic layer and the upper magnetic layer antiferromagnetically coupled to each other by the spacer layer; and
- a non-magnetic pattern that is within the upper magnetic layer and on the spacer layer, the non-magnetic pattern comprising a first junction surface that is in contact with a first portion of the upper magnetic layer; and a second junction surface that is in contact with a second portion of the upper magnetic layer,
- wherein the non-magnetic pattern vertically overlaps with a lower magnetic domain wall in the lower magnetic layer.

* * * * *